United States Patent
Salli

(10) Patent No.: US 8,732,354 B1
(45) Date of Patent: May 20, 2014

(54) METHOD AND APPARATUS FOR CONTROLLING ACCESS TO A STORAGE AREA NETWORK

(75) Inventor: Tommi Salli, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1246 days.

(21) Appl. No.: 11/240,188

(22) Filed: Sep. 30, 2005

(51) Int. Cl.
*G06F 3/00* (2006.01)
*G06F 12/00* (2006.01)
*G06F 13/00* (2006.01)
*G05B 19/00* (2006.01)

(52) U.S. Cl.
USPC ............... 710/36; 710/240; 711/147; 340/5.3

(58) Field of Classification Search
USPC .................. 710/36, 240; 711/147; 340/5.3
See application file for complete search history.

(56) References Cited

U.S. PATENT DOCUMENTS

| | | | |
|---|---|---|---|
| 6,760,823 B1 * | 7/2004 | Schutzman | 711/162 |
| 6,904,477 B2 * | 6/2005 | Padmanabhan et al. | 710/74 |
| 7,093,265 B1 * | 8/2006 | Jantz et al. | 719/321 |
| 7,127,545 B1 * | 10/2006 | Nandi et al. | 710/316 |
| 7,307,948 B2 * | 12/2007 | Infante et al. | 370/225 |
| 7,912,971 B1 * | 3/2011 | Dunn | 709/229 |
| 2003/0149763 A1 | 8/2003 | Heitman et al. | |
| 2003/0149795 A1 | 8/2003 | Lamb et al. | |
| 2004/0160973 A1 * | 8/2004 | Jones | 370/419 |
| 2005/0050392 A1 * | 3/2005 | Baba et al. | 714/25 |
| 2005/0091441 A1 * | 4/2005 | Qi et al. | 711/5 |

OTHER PUBLICATIONS

Salli, T., "Proposal for New Places for DMP Module", *Using VxVM and DMP to Increase Security in FC Networks*, Veritas Software Corporation,(Feb. 2005), 1-8.
Trantham, G., "Veritas Dynamic Multipathing (DMP)", *Veritas VxVM Storage Management Software*, www.veritas.com,(May 2000),1-36.
Yoshida, Hu, "LUN Security Considerations for Storage Area Networks", *Hitachi Data Systems*, (1999),1-10.

* cited by examiner

*Primary Examiner* — Zachary K Huson
(74) *Attorney, Agent, or Firm* — Campbell Stephenson LLP

(57) ABSTRACT

A method and apparatus for controlling access to a storage area network among a group of hosts in a distributed computing environment. A host requests access to the storage area network by issuing an input/output request, and the input/output request is intercepted at the dynamic multipath (DMP) layer. The DMP layer checks the input/output request against an access control list. The DMP layer can grant or deny the input/output request from the host system. If the input/output request is granted, then the DMP layer passes on the input/output request to the HBA driver layer and the host is allowed to access the storage area network. If the request to access the storage area network is denied, the DMP management layer can initiate an appropriate response, such as a security procedure or generation of an error message alerting a user the request has been denied.

16 Claims, 5 Drawing Sheets

METHOD AND APPARATUS FOR CONTROLLING ACCESS TO A STORAGE AREA NETWORK

BACKGROUND OF THE INVENTION

1. Field of the Invention

Embodiments of the present invention generally relate to data storage systems and, more particularly, to controlling access to a storage area network in a distributed computing environment.

2. Description of the Related Art

Computer networks have multiple hosts that share storage on a storage area network (SAN). A SAN provides multiple benefits, allowing for remote data backup and disaster recovery over a computer network, centralized administration of the data, and high availability of the data to the computer network. Sharing storage simplifies storage administration and adds flexibility since cables and storage devices do not have to be physically moved to move storage from one host to another. Adding additional storage capacity to the SAN benefits each host on the computer network. Controlling access to the SAN is important because a host has the ability to overwrite or corrupt data that has been stored on the SAN by another host.

Dynamic multipathing (DMP) is a method of providing two or more hardware paths to a single storage unit such as a storage unit or storage array. For example, the physical hardware can have at least two paths, such as c1t1d0 and c2t1d0, directing input/output (I/O) to the same storage unit. A volume manager such as VERITAS VOLUME MANAGER available from Veritas Corporation of Mountain View, Calif. can be used to select the paths. For example, the volume manager arbitrarily selects one of the two storage units and creates a single device entry, then transfers data across both paths to the I/O of the computers. DMP is enabled by default; the volume manager detects multiple paths with universal world wide device identifiers and manages multipath targets, such as disk arrays, which define policies for using more than one path. DMP provides greater reliability to a path failover mechanism. In the event of a loss of one connection to a storage unit, the system continues to access the critical data over the other connections until a failed path is replaced. DMP provides greater I/O throughput by balancing the I/O load uniformly across multiple I/O paths to the storage unit.

DMP is a layer in the UNIX storage I/O software stack. While different platform implementations differ in detail, UNIX I/O software stacks share a common overall structure, simply because all perform the same basic functions to provide I/O services to a computer. In the conventional UNIX I/O software stack, the DMP management layer resides above the operating system SCSI driver layer.

This approach does not meet all the needs introduced by today's fiber channel storage networks. For example, any host that is able to access a storage unit, whether by design or by error, is able to write data to the storage unit using the operating system SCSI layer drivers. To prevent hosts from making I/O requests to the storage units and logical unit numbers (LUNs) that do not belong to them, administrators must take some external action unrelated to the volume manager, such as LUN masking or zoning. Moreover, even with a host's own storage units and LUNs, there is the possibility of erroneously overwriting private or public regions because of human error or as a result of sabotage.

In a distributed volume manager, additional security issues may arise. A distributed volume manager provides a data center wide shared disk pool with volumes from the same disk group shared among multiple hosts. A user can implement a storage area network (SAN) wide disk group and share volumes from the group among multiple hosts. This allows users to provide the right amount of storage to each server without regard for boundaries imposed by physical LUNs. With a SAN volume manager, a number of LUNs could be sliced into multiple volumes to be exported to multiple hosts.

Allocating part of LUNs to volumes belonging to different hosts compromises security, because every host that has a volume slice on a shared LUN has access to the entire LUN through the operating system SCSI layer. As a result, any host could destroy or impair data on a shared LUN, either by accident or maliciously. An error or intrusion on one host can corrupt the data of every host whose volume shares the LUN affected by the error or intrusion. There is potential for a data center wide breakdown in service as well as unrecoverable data corruption.

Multiple connections to a LUN are often implemented as an active/passive connection in high availability configurations of a computer network. In an active/passive connection, there are two connections to a LUN, but only one that is active. The passive channel is only used if a failure occurs on the active channel. A problem encountered with this approach is that certain operating system operations on multipath devices can cause failover of active/passive disk arrays LUNs, resulting in small but noticeable service interruptions from the host issuing the command. This interruption will be noticed in all LUNs that are visible to the host where the command was executed. The interruption generates even bigger problems in environments where access to the same LUNs is shared between multiple hosts. In these situations, all hosts sharing affected LUNs will notice an interruption in service.

Disk and LUN-level security can be implemented using SCSI-3 persistent group reservations (PGR), but such a solution is necessarily incomplete, and moreover, does not solve the problem of I/O requests made directly to a storage unit and LUNs by operating system commands and utilities. SCSI-3 reservations apply to entire storage units and LUNs, so all the hosts using volume share must register their PGR keys with that LUN. Registration prevents non-registered hosts from writing to a LUN or storage unit, but any registered host has access to the entire device. Moreover, the SCSI-3 standards specify a maximum of 32 keys per LUN. This would limit storage unit or LUN sharing to a maximum of 32 nodes. In environments where the expectation is a common pool of storage for an entire data center, it will almost certainly become a severe constraint.

Accordingly, a need exists for a method and apparatus for controlling access to a storage area network in such a manner that a host cannot overwrite or corrupt data on a volume or LUN controlled by another host.

SUMMARY OF THE INVENTION

Embodiments of the present invention are generally directed to a method and apparatus for controlling access to a storage area network among a group of hosts in a distributed computing environment. When a host requests access to the storage area network, the input/output (I/O) request from the operating system SCSI driver is intercepted at the dynamic multipath (DMP) layer. The DMP layer checks the I/O request against an access control list (ACL). The DMP layer can grant or deny the I/O request from the host system. If the DMP layer passes the I/O request to the host bus adapter (HBA) driver layer, then the host can access the storage area network. If the request to access the storage area network is denied, then the DMP management software can initiate an appropriate security procedure or generate an error message alerting the user that access to the storage area network has been denied.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this, application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
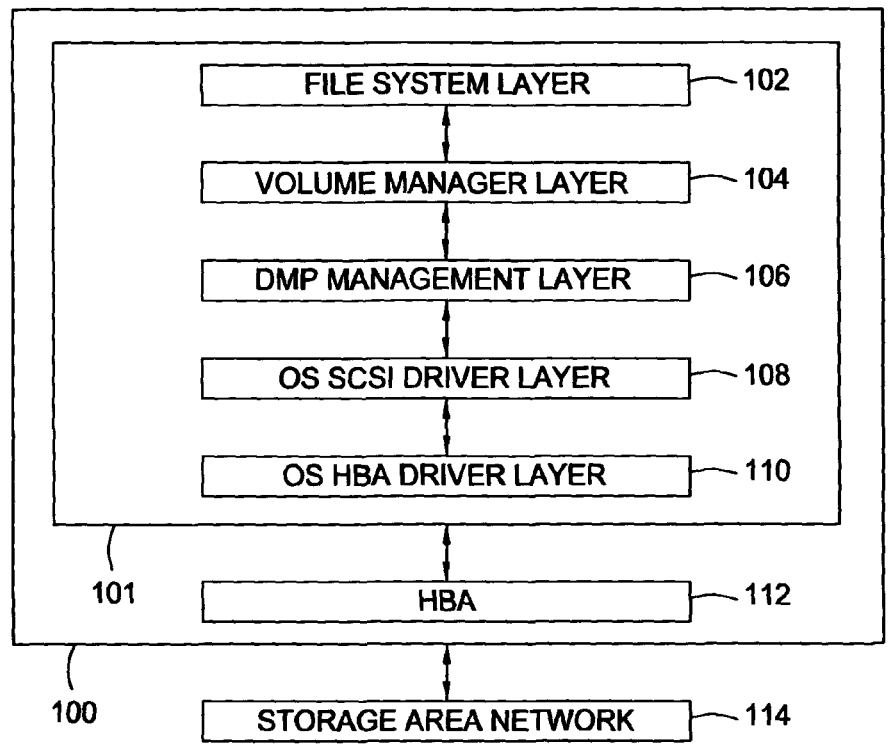
FIG. 1 is a model of a prior art UNIX storage I/O software stack in which the DMP management layer is located above the operating system SCSI driver.

FIG. 1 is a block diagram of a conventional UNIX storage I/O software stack 101. The software stack 101 resides in the memory of a host computer 100. The host computer 100 is generally a server computer, but may also be a desktop computer, laptop computer or any other computer that can access a storage area network. The topmost layer of the software stack 101 is the file system layer 102. The file system layer 102 provides an administrative interface into the file system to support commands in a file system independent manner. A user can make an input/output (I/O) request to read, write or access data through the file system layer. The volume manager layer 104 resides below the file system layer 102. The volume manager layer 104 comprises a volume manager that provides virtualization services to the host computer 100. An exemplary volume manager is VERITAS VOLUME MANAGER available from Veritas Corporation of Mountain View, Calif. The volume manager layer 104 makes multiple or separate storage units, physical storage devices, logical storage devices or logical unit numbers on the storage area network appear as one physical device to the file system layer 102. The dynamic multipath (DMP) management layer 106 resides below the volume manager layer 104 and on top of the operating system SCSI driver layer 108. The dynamic multipath layer 106 determines which path data will travel to access a storage unit, physical storage device, logical storage device or logical unit number (LUN). The dynamic multipath management layer 106 passes the identity of the selected physical storage device, logical storage device or LUN to the operating system SCSI driver layer 108 and the SCSI driver issues an I/O request to the operating system host bus adapter (HBA) layer 110. The HBA layer 110 forwards the I/O request to the HBA adapter 112 which accesses the storage area network (SAN) 114 and completes the I/O request. As discussed above, having the operating system SCSI driver layer 108 coupled to the HBA layer 110 facilitates a variety of security issues.

Figure 2:
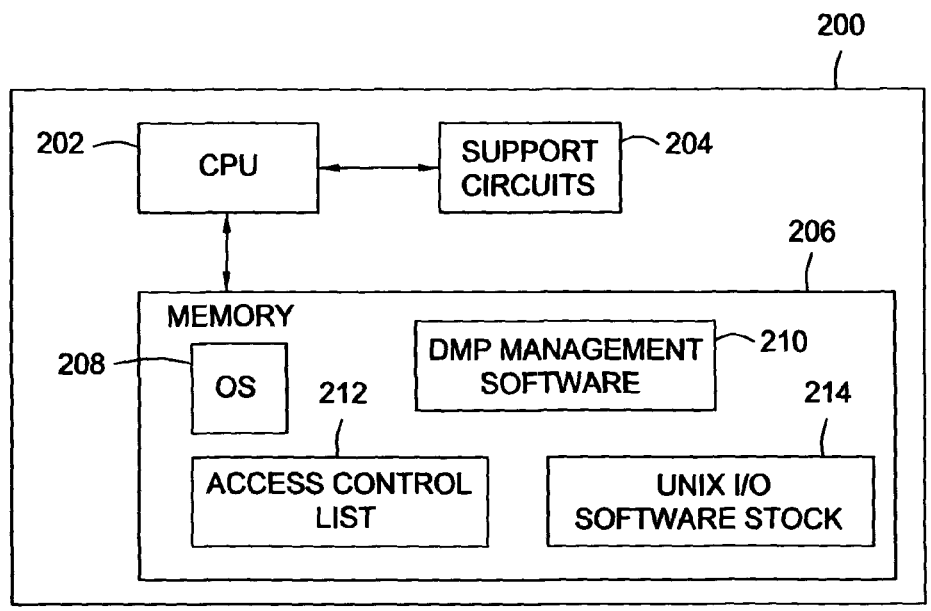
FIG. 2 is a block diagram of a host in which an embodiment of the present invention operates.

FIG. 2 depicts a block diagram of a host 200 in which one embodiment of the present invention may be utilized to improve security in a distributed computing environment. The host 200 may include a work station, personal computer, server, PDA (Personal Digital Assistant), or any other device configured to execute software implementing a file system and accessing a SAN. The host 200 comprises a central processing unit 202, support circuits 204, and memory 206. The CPU 202 may comprise one or more of conventionally available microprocessors or microcontrollers. The support circuits 204 are well known support circuits that are used to facilitate the operation of the CPU 202. The support circuits 204 include power supplies, clock circuits, input/output interface circuitry, cache, and the like.

The memory 206 may comprise random access memory, read only memory, removable disc memory, flash memory, optical memory, and various combinations of these types of memory. The memory 206 is sometimes referred to as main memory and may be in part used as cache memory or buffer memory. The memory stores various forms of software and files, such as an operating system 208, dynamic multipath (DMP) manager software 210, an access control list (ACL) 212, and an I/O software stack 214. The computer 100 may be coupled to a SAN.

The storage area network 114 can include one or more various types of networks. Network 114 may include local area networks (LAN) or wide area networks (WAN), such as the Internet, or a combination of one or more of different types of networks. Various media can be used to implement the network 114 including Ethernet links, wireless links, coaxial cables, and the like.

Figure 3:
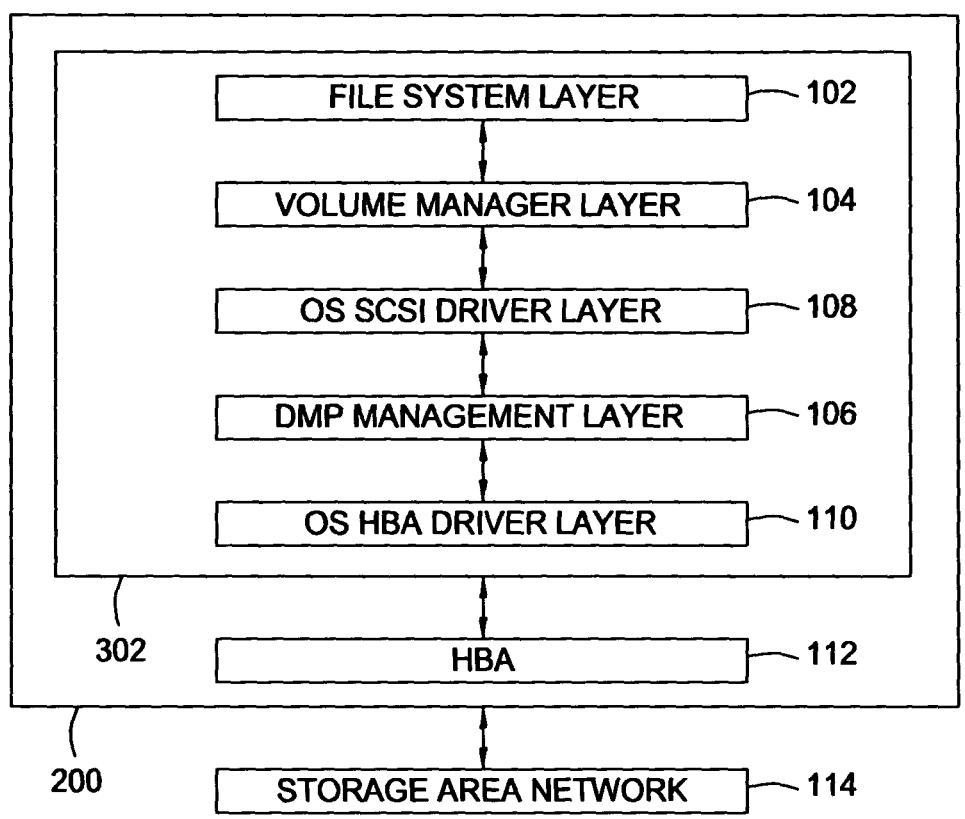
FIG. 3 is a model of a UNIX storage I/O software stack that forms one embodiment of the present invention, where the DMP management layer is below the operating system SCSI layer and above the operating system HBA drivers.

FIG. 3 is a block diagram of the invention's storage I/O software stack 302 that resides in the memory 206 of a host computer 200. The file system layer 102 provides an administrative interface into the file system to support commands in a file system independent manner. A user can make an input/output (I/O) request to read, write or otherwise access data through the file system layer. The volume manager layer 104 resides below the file system layer 102. The volume manager layer 104 comprises a volume manager that provides virtualization services to the host computer 200. An exemplary volume manager is VERITAS VOLUME MANAGER available from Veritas Corporation of Mountain View, Calif. The volume manager layer 104 makes multiple or separate storage units, physical storage devices, logical storage devices or logical unit numbers on the storage area network appear as one physical device to the file system layer 102. The dynamic multipath (DMP) layer 106 resides below the SCSI driver layer 108 and on top of the operating system HBA layer 110. The DMP layer 106 intercepts I/O requests from the SCSI driver layer 108 and checks the I/O request against an access control list. The DMP layer 106 determines whether to grant the I/O request and access to a particular physical storage device, logical storage device or logical unit number (LUN). The DMP layer 106 forwards the I/O requests it has granted access to the operating system (OS) host bus adapter (HBA) driver layer 110. The OS HBA layer 110 forwards the I/O request to the HBA adapter 112 which accesses the storage area network (SAN) 114 and completes the I/O request.

Figure 4:
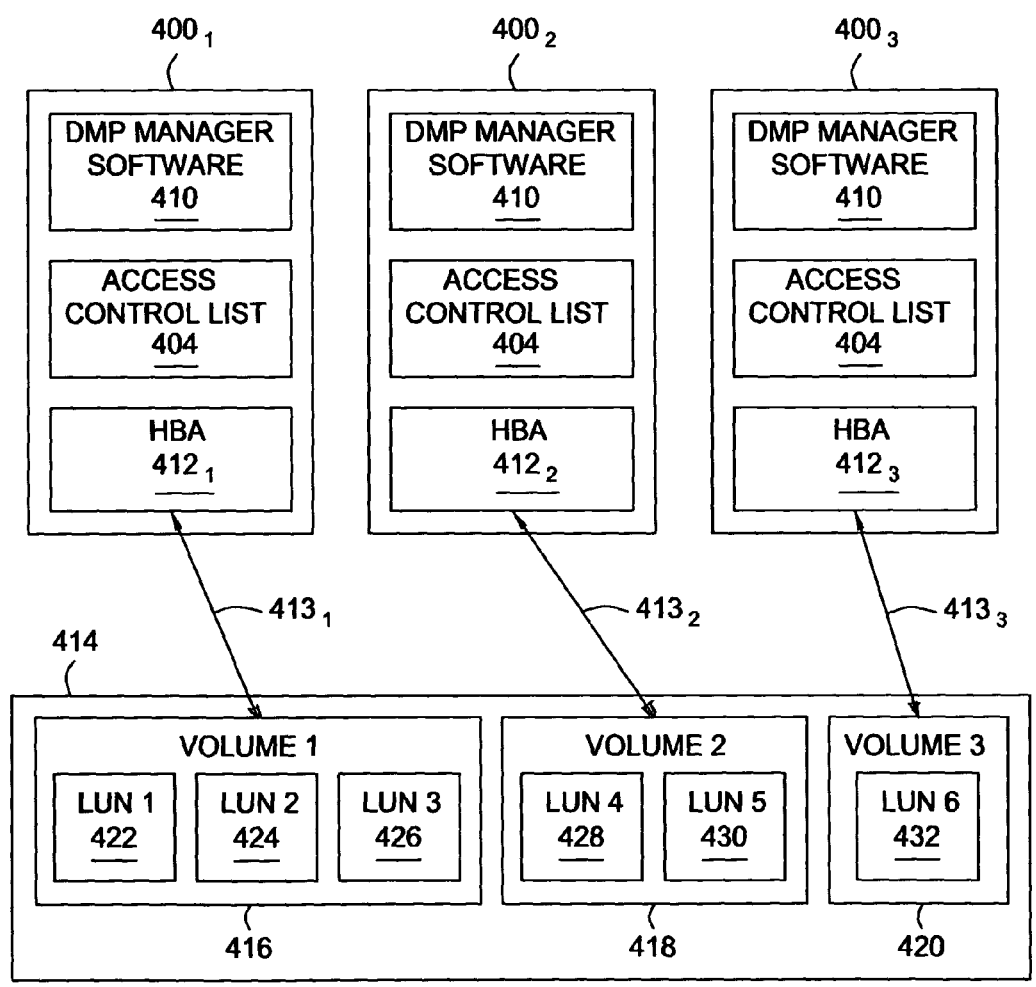
FIG. 4 is an example of a computing environment in which an embodiment of the present invention can operate.

FIG. 4 is a block diagram of an environment in which the present invention is enabled. Hosts $400_1$, $400_2$, and $400_3$ are connected by HBAs $412_1$, $412_2$ and $412_3$ to a SAN 414 over communication links $413_1$, $413_2$ and $413_3$. The SAN 414 comprises a plurality of storage volumes, volume 1 416, volume 2 418, and volume 3 420. Volume 1 416 comprises LUNs 1, 2, and 3 which are numbered 422, 424 and 426 respectively. Volume 2 418 comprises LUN 4 428 and LUN 5 430. Volume 3 420 comprises LUN 6 432. Host $400_1$ can read and write to volume 1 416. Host $400_2$ can read and write to volume 2 418. Host $400_3$ can read and write to volume 3 420. Host $400_1$ acts as a volume manager and labels the LUNs within volume 1 416, 2 418, and 3 420.

The dynamic multipath (DMP) manager software 410 controls whether a host 400 can access a particular volume 416, 418, and 420. The dynamic multipath manager software 410 also controls whether a host $400_1$, $400_2$, and $400_3$ can access the volume table of contents (VTOC) and label a LUN 422, 424, 426, 428, 430 and 432. The DMP manager software 410 compares an I/O request to information stored on an access control list 404. Any I/O request which is not specifically allowed on the access control list 404 is denied. Thus, the DMP manager software 410 prevents a host $400_1$, $400_2$, and $400_3$ from accidentally writing data to the wrong volume or a virus or trojan maliciously overwriting data on a LUN 422, 424, 426, 428, 430 and 432.

Figure 5:
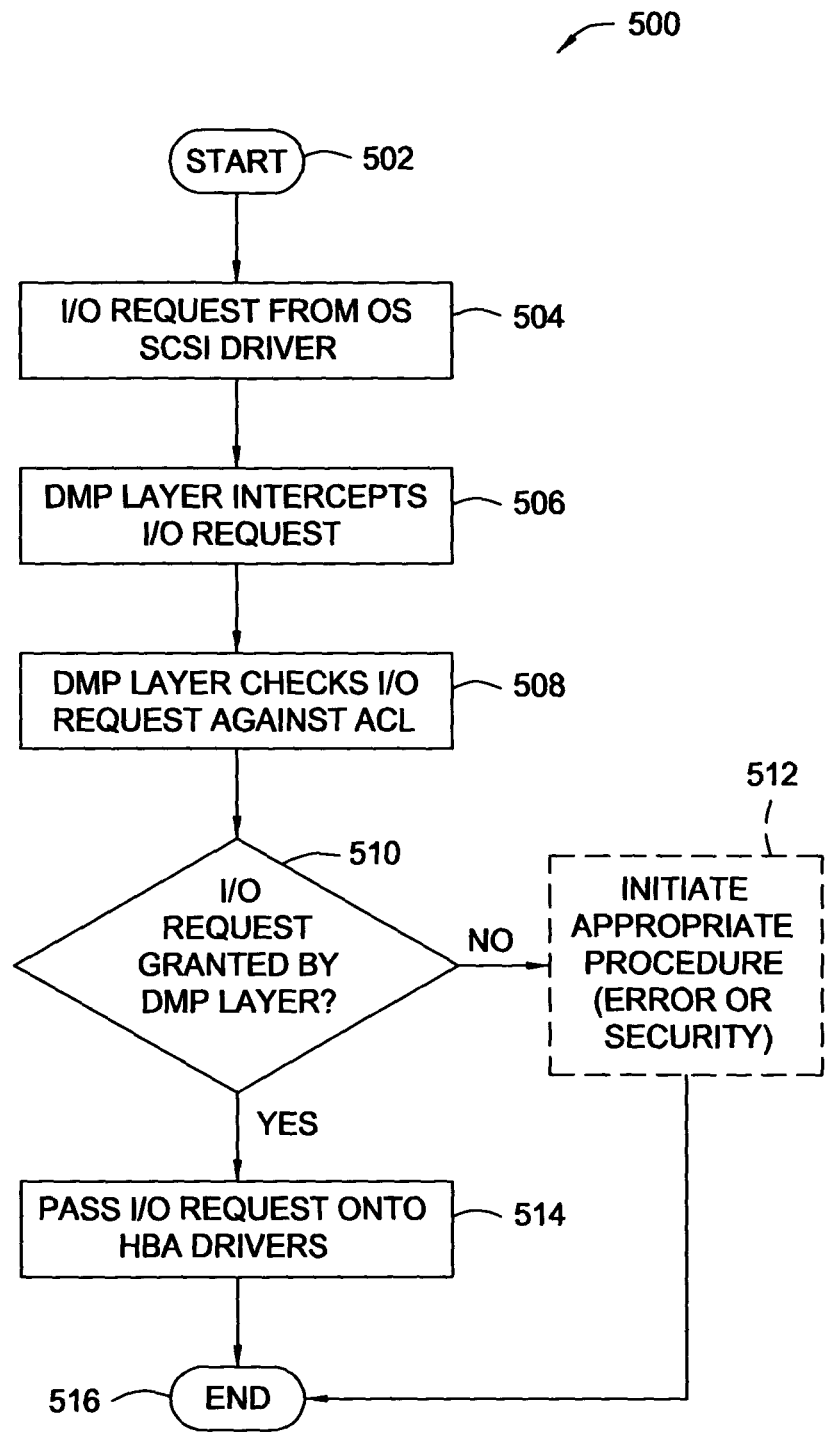
FIG. 5 is a flow diagram of a method for controlling access to a storage area network that utilizes an embodiment of the present invention.

FIG. 5 is a flow diagram of a method 500 for controlling access to a storage area network in accordance with the present invention. The method 500 starts at step 502 and proceeds to step 504. At step 504, an I/O request is generated by an operating system SCSI driver and the method proceeds to step 506. At step 506, the DMP layer intercepts the I/O request from the SCSI driver. At step 508, the DMP layer checks the I/O request against an access control list (ACL). At step 510, the DMP layer makes a decision whether or not to grant the I/O request generated by the SCSI driver. Any access that is not specifically allowed by the ACL is denied. If the I/O request is denied the method may proceed to optional step 512 wherein an error message is generated to alert the user or a security procedure is initiated in case access was requested maliciously. If the I/O request is granted the method proceeds to step 514 wherein the I/O request is forwarded to the HBA driver layer. The method ends at step 516.

Figure 6:
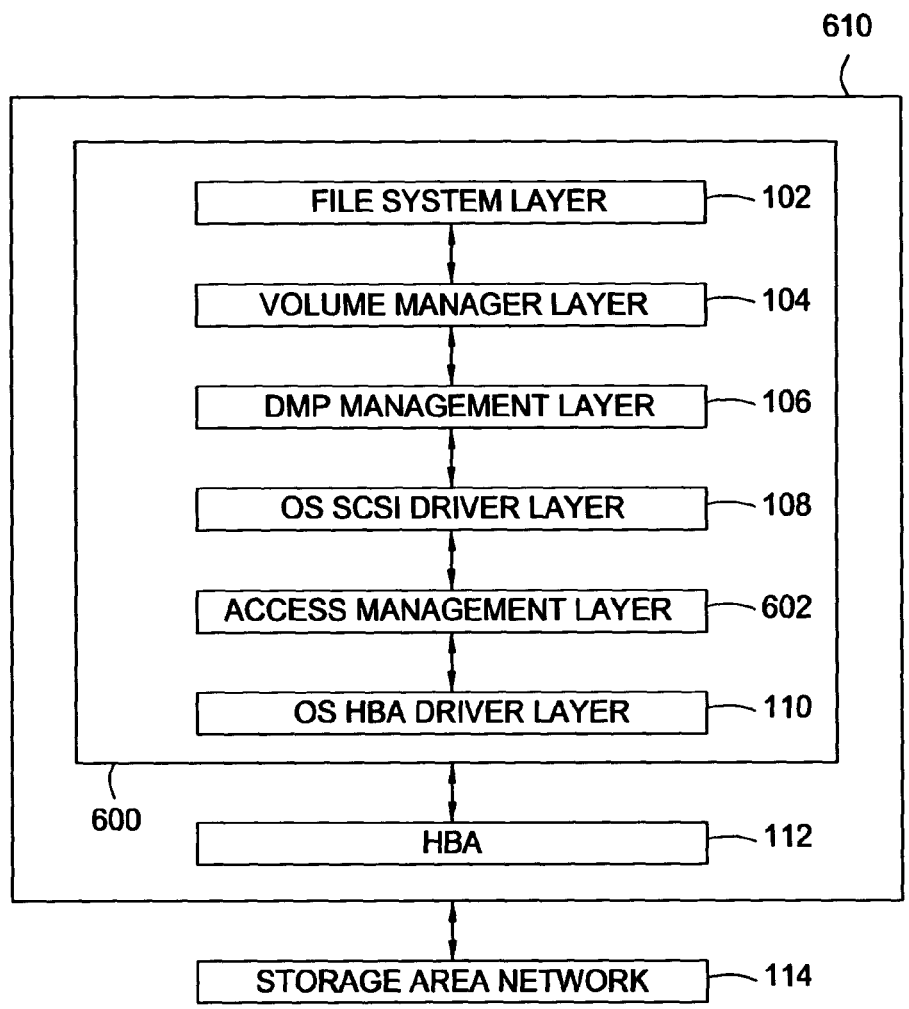
FIG. 6 is a model of a UNIX storage I/O software stack that forms an alternative embodiment of the present invention. An access management layer is inserted between the operating system SCSI driver layer and above the operating system HBA driver layer.

FIG. 6 is a block diagram of an alternative embodiment of the invention's storage I/O software stack 600. The software stack 600 resides in the memory of a host computer 610. The host computer 610 is generally a server computer, but may also be a desktop computer, laptop computer or any other computer that can access a storage area network. The topmost layer of the software stack 600 is the file system layer 102. The file system layer 102 provides an administrative interface into the file system to support commands in a file system independent manner. A user can make an input/output (I/O) request to read, write or access data through the file system layer. The volume manager layer 104 resides below the file system layer 102. The volume manager layer 104 comprises a volume manager that provides virtualization services to the host computer 200. An exemplary volume manager is VERITAS VOLUME MANAGER available from Veritas Corporation of Mountain View, Calif. The volume manager layer 104 makes multiple or separate storage units, physical storage devices, logical storage devices or logical unit numbers (LUNs) on the storage area network appear as one physical device to the file system layer 102. The dynamic multipath (DMP) management layer 106 resides below the volume manager layer 104 and on top of the operating system SCSI driver layer 108. The DMP management layer 106 determines which path data will travel to access a storage unit, physical storage device, logical storage device or logical unit number (LUN). The DMP management layer 106 passes the identity of the selected physical storage device, logical storage device or LUN to the operating system SCSI driver layer 108. An access management layer 602 resides between the operating system SCSI driver layer 108 and the operating system (OS) host bus adapter (HBA) layer 110. The access management layer 602 compares an I/O request to information on an access control list. Access not specifically granted by the access control list is denied. If the access management layer 602 grants the I/O request, the I/O request is forwarded to the operating system (OS) host bus adapter (HBA) layer 110. The OS HBA layer 110 forwards the I/O request to the HBA adapter 112 which accesses the storage area network (SAN) 114 and completes the I/O request.

The host computer 610 operates in an environment similar to the one described in FIG. 4. Adding an access management layer 602 to the conventional UNIX input/output software stack provides the additional benefit of allowing the invention to function with proprietary implementations of UNIX, such as those provided by Sun and Hewlett-Packard.

In this manner, the invention can prevent unauthorized access between a host computer and a storage area network. Unauthorized access to a storage area network, whether unintentional or malicious, may corrupt or overwrite data on the storage area network. The invention seamlessly integrates with the storage I/O software stack to provided a layer of security previously unavailable within the conventional UNIX storage I/O software stack.

While the foregoing is directed to embodiments of the present invention, other and further embodiments of the invention may be devised without departing from the basic scope thereof, and the scope thereof is determined by the claims that follow.

The invention claimed is:

1. A method comprising:
   sending an input/output request from a volume manager layer to an operating system small computer system interface (SCSI) driver layer, wherein
   the input/output request is initiated by a host computer, and
   the host computer is coupled to a storage area network;
   sending the input/output request from the operating system SCSI driver layer to a dynamic multipath management layer;
   determining whether to grant the input/output request by comparing information of the input/output request with information in an access control list, wherein
   the determining is performed at the dynamic multipath management layer, the determining is configured to prevent unauthorized access to the storage area network, any access not specifically allowed by the access control list is unauthorized, and the access control list indicates whether the host computer is allowed access to a volume of the storage area network needed to process the input/output request; and in response to determining that the input/output request is granted, sending the input/output request from the dynamic multipath management layer to an operating system host bus adapter driver layer.

2. The method of claim 1, further comprising:
receiving the input/output request;
sending the input/output request to a file system layer; and
sending the input/output request from the file system layer to the volume manager layer.

3. The method of claim 1, further comprising:
in response to determining that the input/output request is not granted, generating an error message or initiating a security procedure.

4. A method comprising:
sending an input/output request from a volume manager layer to a dynamic multipath management layer, wherein
the input/output request is initiated by a host computer, and
the host computer is coupled to a storage area network;
sending the input/output request from the dynamic multipath management layer to an operating system small computer system interface (SCSI) driver layer;
sending the input/output request from the operating system SCSI driver layer to an access management layer;
determining whether to grant the input/output request by comparing information of the input/output request with information in an access control list, wherein
the determining is performed at the access management layer,
the determining is configured to prevent unauthorized access to the storage area network,
any access not specifically allowed by the access control list is unauthorized, and
the access control list indicates whether the host computer is allowed access to a volume of the storage area network needed to process the input/output request; and
in response to determining that the input/output request is granted, sending the input/output request from the access management layer to an operating system host bus adapter driver layer.

5. The method of claim 4, further comprising:
receiving the input/output request;
sending the input/output request to a file system layer; and
sending the input/output request from the file system layer to the volume manager layer.

6. The method of claim 4, further comprising:
in response to determining that the input/output request is not granted, generating an error message or initiating a security procedure.

7. An apparatus comprising:
a host computer, wherein
the host computer operates an input/output software stack,
the input/output software stack comprises
a file system layer,
a volume manager layer,
an operating system small computer system interface (SCSI) driver layer,
a dynamic multipath management layer, and
an operating system host bus adapter layer, and
the host computer is coupled to a storage area network; and
wherein the dynamic multipath management layer is configured to
determine whether to grant an input/output request initiated by the host computer by comparing information of the input/output request with information in an access control list, wherein
determining whether to grant the input/output request is configured to prevent unauthorized access to the storage area network,
any access not specifically allowed by the access control list is unauthorized, and
the access control list indicates whether the host computer is allowed access to a volume of the storage area network needed to process the input/output request, and
send the input/output request to the operating system host bus adapter driver layer, in response to determining that the input/output request is granted.

8. The apparatus of claim 7, wherein
the dynamic multipath management layer obtains filtering information from sources comprising the volume manager layer, the access control list, and a configuration file.

9. The apparatus of claim 8, wherein
the dynamic multipath management layer intercepts the input/output request from the file system layer and grants or denies the input/output request in accordance with the filtering information.

10. The apparatus of claim 9, wherein
the dynamic multipath management layer initiates an appropriate response upon denying the input/output request, and
the appropriate response comprises the generation of an error message or initiation of a security procedure.

11. An apparatus comprising:
a host computer, wherein
the host computer operates an input/output software stack,
the input/output software stack comprises
a file system layer,
a volume manager layer,
a dynamic multipath management layer,
an operating system small computer system interface (SCSI) driver layer,
an access management layer, and
an operating system host bus adapter layer, and
the host computer is coupled to a storage area network; and
wherein the dynamic multipath management layer is configured to
determine whether to grant an input/output request initiated by the host computer by comparing information of the input/output request with information in an access control list, wherein
determining whether to grant the input/output request is configured to prevent unauthorized access to the storage area network,
any access not specifically allowed by the access control list is unauthorized, and the access control list indicates whether the host computer is allowed access to a volume of the storage area network needed to process the input/output request, and send the input/output request to the operating system host bus adapter driver layer, in response to determining that the input/output request is granted.

12. The apparatus of claim 11, wherein
the access management layer obtains filtering information from sources comprising the volume manager layer, the access control list, and a configuration file.

13. The apparatus of claim 12, wherein
the access management layer intercepts the input/output request from the file system layer and grants or denies the input/output request in accordance with the filtering information.

14. The apparatus of claim 13, wherein
the access management layer initiates an appropriate response upon denying the input/output request, and
the appropriate response comprises the generation of an error message or initiation of a security procedure.

15. The method of claim 1, wherein the operating system host bus adapter driver layer is configured to transmit the input/output request to the storage area network, in response to the determining that the input/output request is granted.

16. The method of claim 1, wherein the host computer comprises the volume manager layer, the operating system SCSI driver layer, the dynamic multipath management layer, and the operating system host bus adapter driver layer.

\* \* \* \* \*